(12) United States Patent
Shim

(10) Patent No.: US 7,701,635 B2
(45) Date of Patent: Apr. 20, 2010

(54) MICROLENS, AND METHOD OF FABRICATING THEREOF

(75) Inventor: Cheon-Man Shim, Yeongdeungpo-gu (KR)

(73) Assignee: Dongbu HiTek Co., Ltd., Seoul (KR)

( * ) Notice: Subject to any disclaimer, the term of this patent is extended or adjusted under 35 U.S.C. 154(b) by 0 days.

(21) Appl. No.: 12/200,944

(22) Filed: Aug. 29, 2008

(65) Prior Publication Data

US 2009/0059391 A1   Mar. 5, 2009

(30) Foreign Application Priority Data

Aug. 30, 2007   (KR) ............... 10-2007-0087781

(51) Int. Cl.
*G02B 27/10* (2006.01)
*G03F 1/00* (2006.01)
*B29D 11/00* (2006.01)

(52) U.S. Cl. ............... 359/619; 430/321; 216/26
(58) Field of Classification Search ............... 359/619, 359/620; 216/26; 430/321; 257/294, 432
See application file for complete search history.

(56) References Cited

U.S. PATENT DOCUMENTS

| 5,384,231 A * | 1/1995 | Johnson et al. ............. 430/321 |
| 2008/0315341 A1* | 12/2008 | Lee ............................. 257/432 |

FOREIGN PATENT DOCUMENTS

JP   11-183706   7/1999

\* cited by examiner

*Primary Examiner*—William C Choi
(74) *Attorney, Agent, or Firm*—Sherr & Vaughn, PLLC

(57) ABSTRACT

A microlens for an image sensor fabricated using a seed layer and a method for fabrication of the same that does not involve a reflow process. The method of fabricating a microlens includes forming a seed layer pattern on a wafer, rounding the corner portions of the seed layer pattern by applying plasma, and then depositing an oxide film on the seed layer pattern.

16 Claims, 14 Drawing Sheets

MICROLENS, AND METHOD OF FABRICATING THEREOF

The present application claims priority under 35 U.S.C. §119 to Korean Patent Application No. 10-2007-0087781 (filed on Aug. 30, 2007), which is hereby incorporated by reference in its entirety.

BACKGROUND

An image sensor is a device for transforming first-order, second-order or more optical information such as optical images into electrical signals. An image sensor is generally classified into a complementary metal oxide semiconductor CMOS (Complementary Metal-Oxide Semiconductor) image sensor and a charge coupled device CCD (Charge Coupled Device) image sensor. CCD image sensors have excellent characteristics such as photosensitivity and anti-noise properties as compared to CMOS image sensors, however, highly integrated assembly of CCDs is difficult and CCDs require large quantities of electric power. On the other hand, CMOS image sensors, also called CISs, can be fabricated by more simple processes than those employed for CCD image sensors, are easily formed into highly integrated assemblies, and consume relatively little electric power.

Recent techniques for fabrication of CMOS image sensors and characteristics thereof have been greatly improved in conjunction with rapid technological advancement in the semiconductor industry, therefore, a great deal of research and investigations into development of CMOS image sensors are presently underway. The use of micro-lens (ML) for collection of external light may result in improvement in CIS resolution. In this regard, a photo-resist (PR) is typically used to manufacture an ML, but has a drawback of poor mechanical strength. This drawback has led to increases in the failure rate due to particles generated during chemical mechanical polishing (CMP).

In order to overcome the problems described above, low temperature oxides (LTO) with excellent mechanical strength have been applied to PRs. However, this also has problems in that cracks occur at an interface between the PR and the LTO and propagates through a chip, thereby causing damage to the entire chip during use of a semiconductor device. As a proposal to solve this problem, there is a method for fabricating the entire ML using an LTO whereby a reflowed PR is used as a mask to etch the LTO and, in turn, produce a lens. However, for fabrication of a lens shaped material such as a PR based ML, reflowing PR generates an uneven seed layer.

Figure 1A:
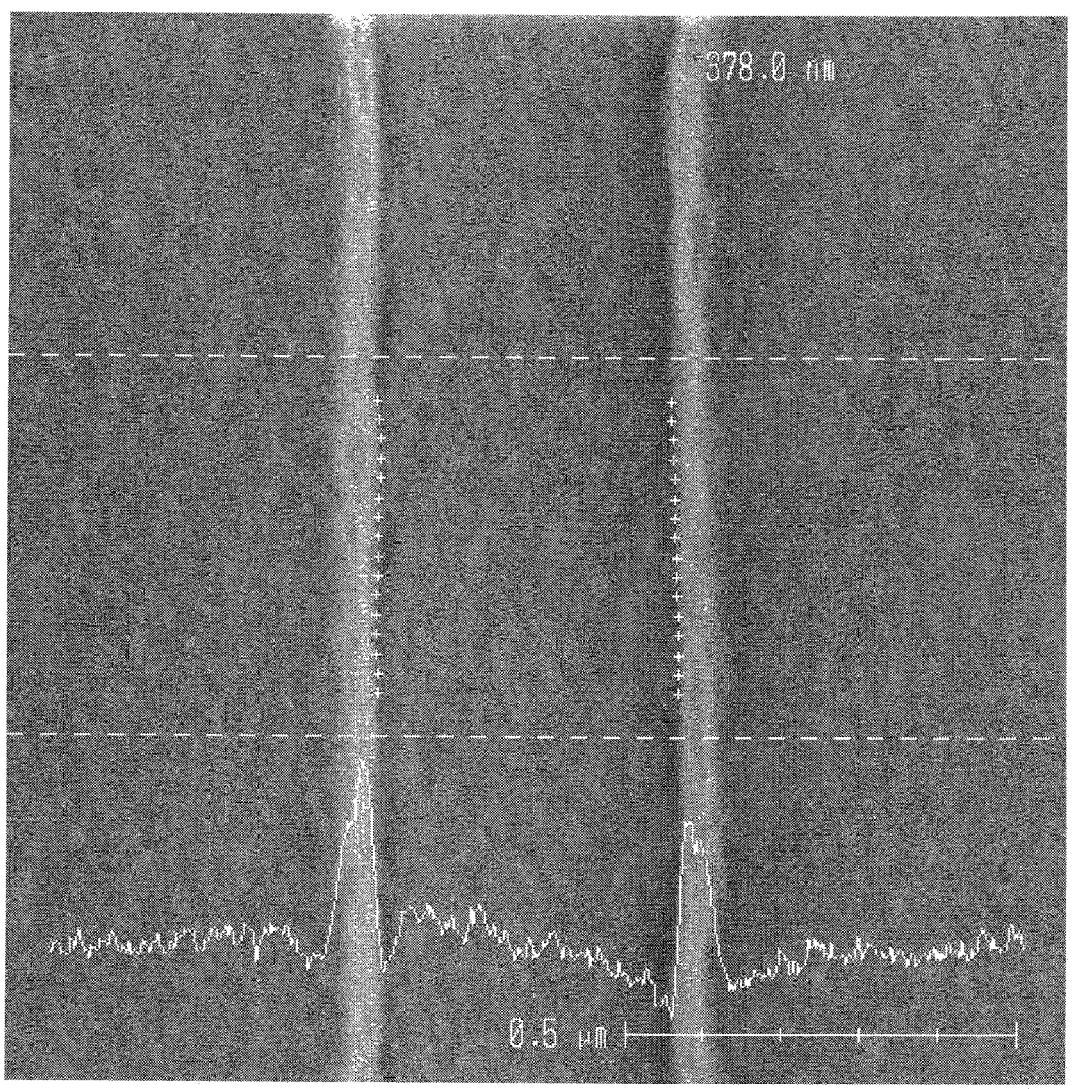
Figure 1B:
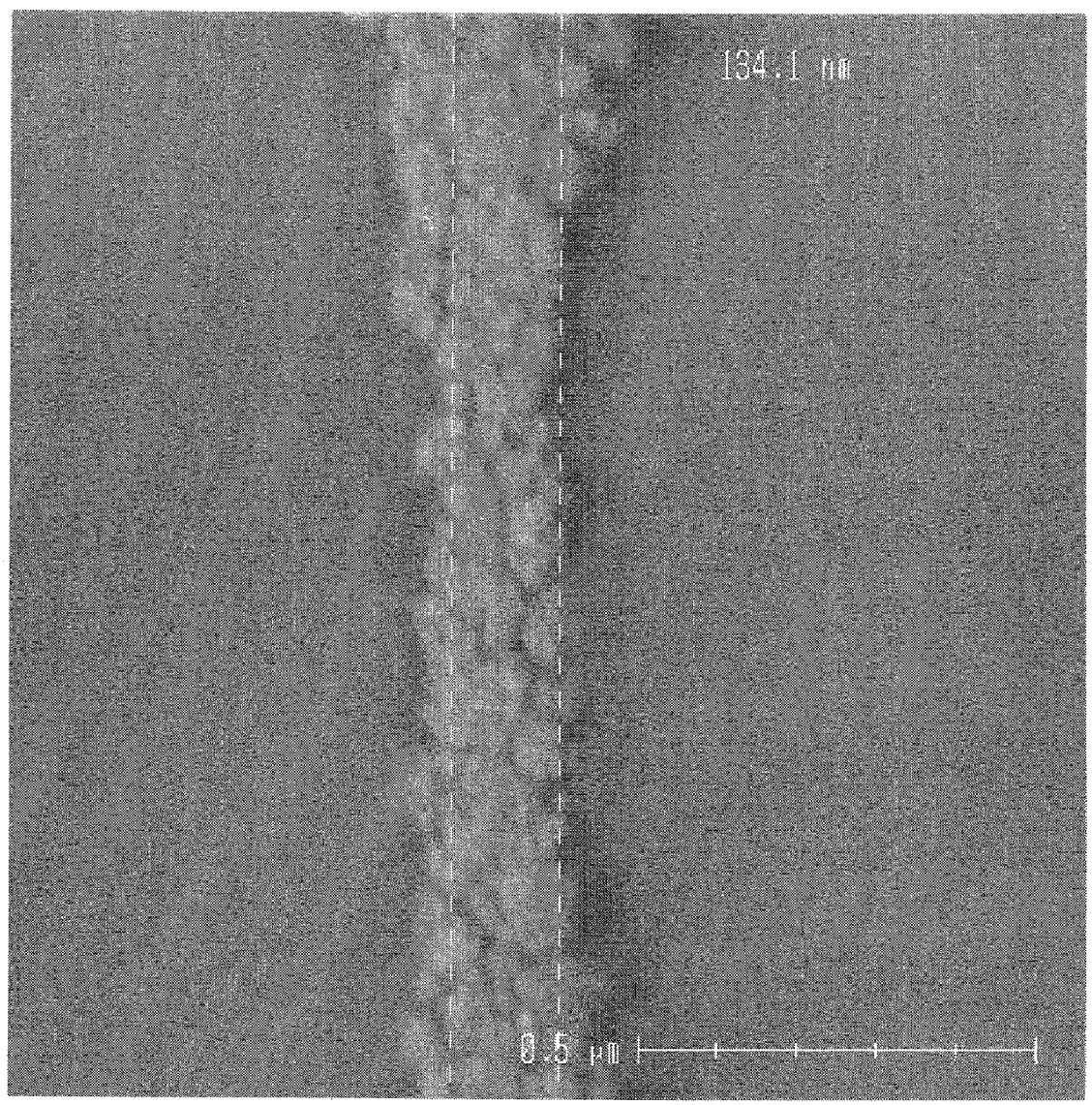
Figure 1C:
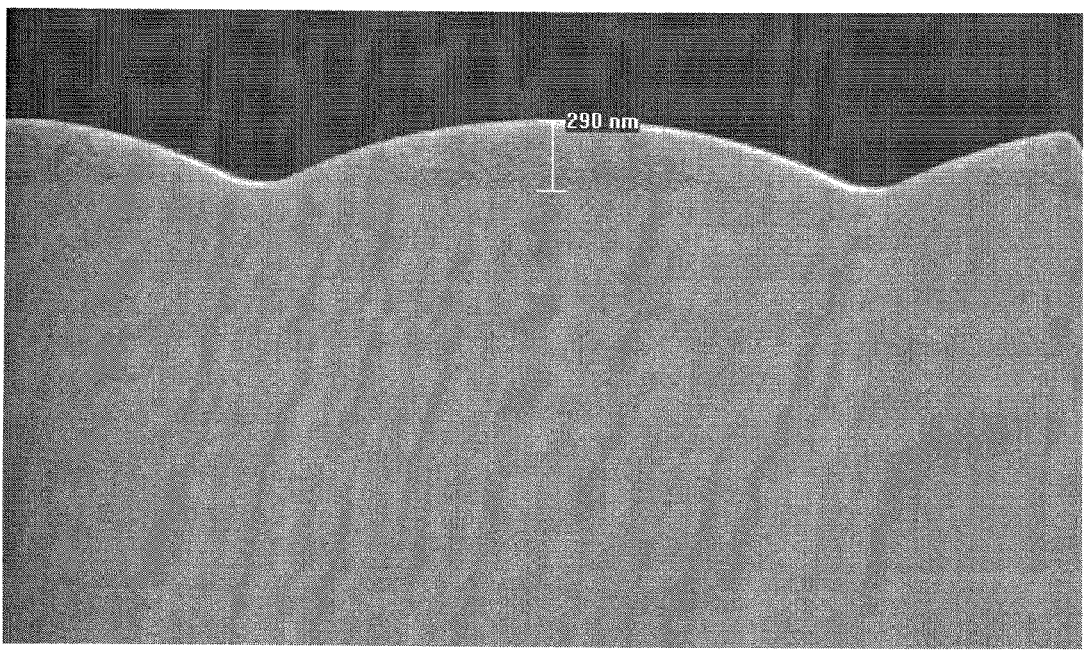
Figure 1D:
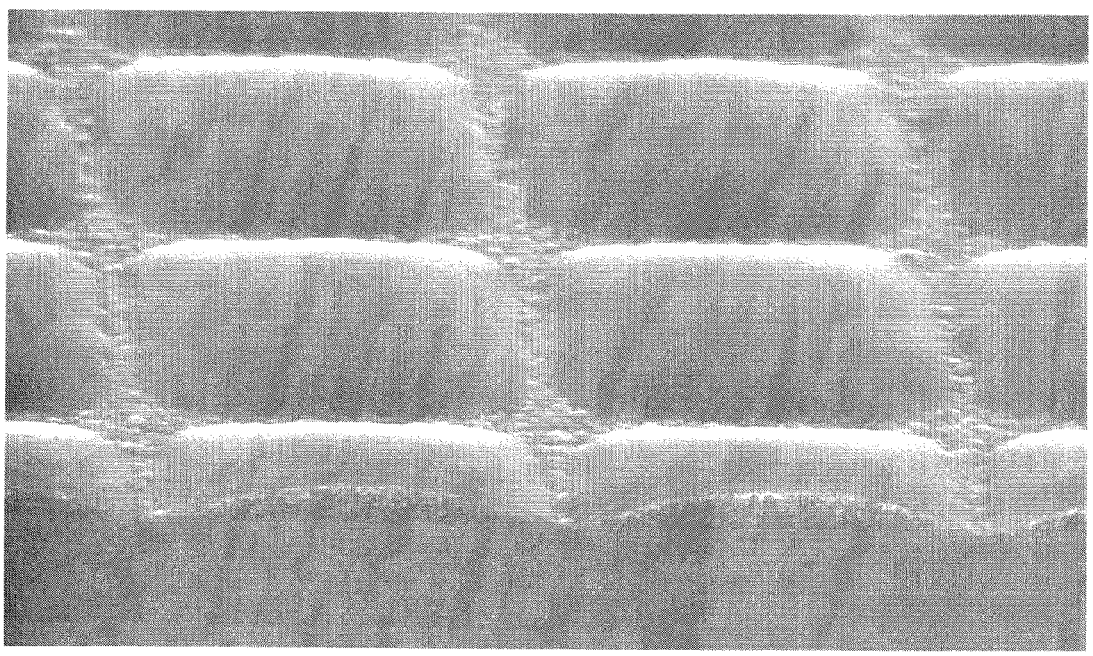

Example FIG. 1A illustrates a condition of an ML before PR reflowing that exhibits a favorable critical dimension (CD) between MLs and high uniformity in a wafer. Example FIG. 1B illustrates a condition of an ML after PR reflowing that exhibits significant deterioration of each CD between MLs and uniformity in a wafer. That is, there will occur a great difference in CDs between pixels after PR reflowing. Example FIG. 1C illustrates a cross-sectional view of a wafer after PR reflowing. Example FIG. 1D is a tilt image illustrating the condition of the wafer after PR reflowing.

Figure 2A:
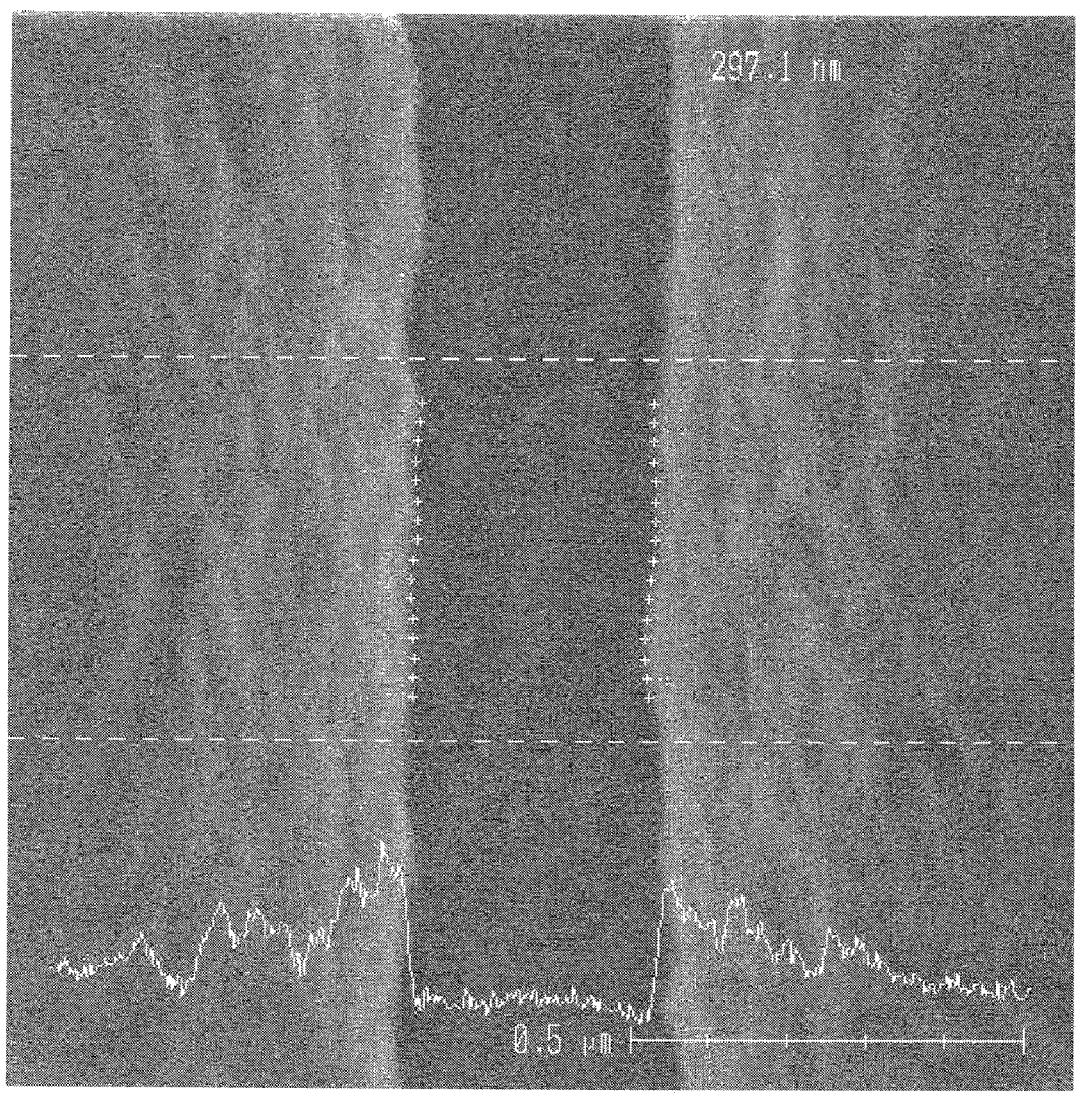
Figure 2B:
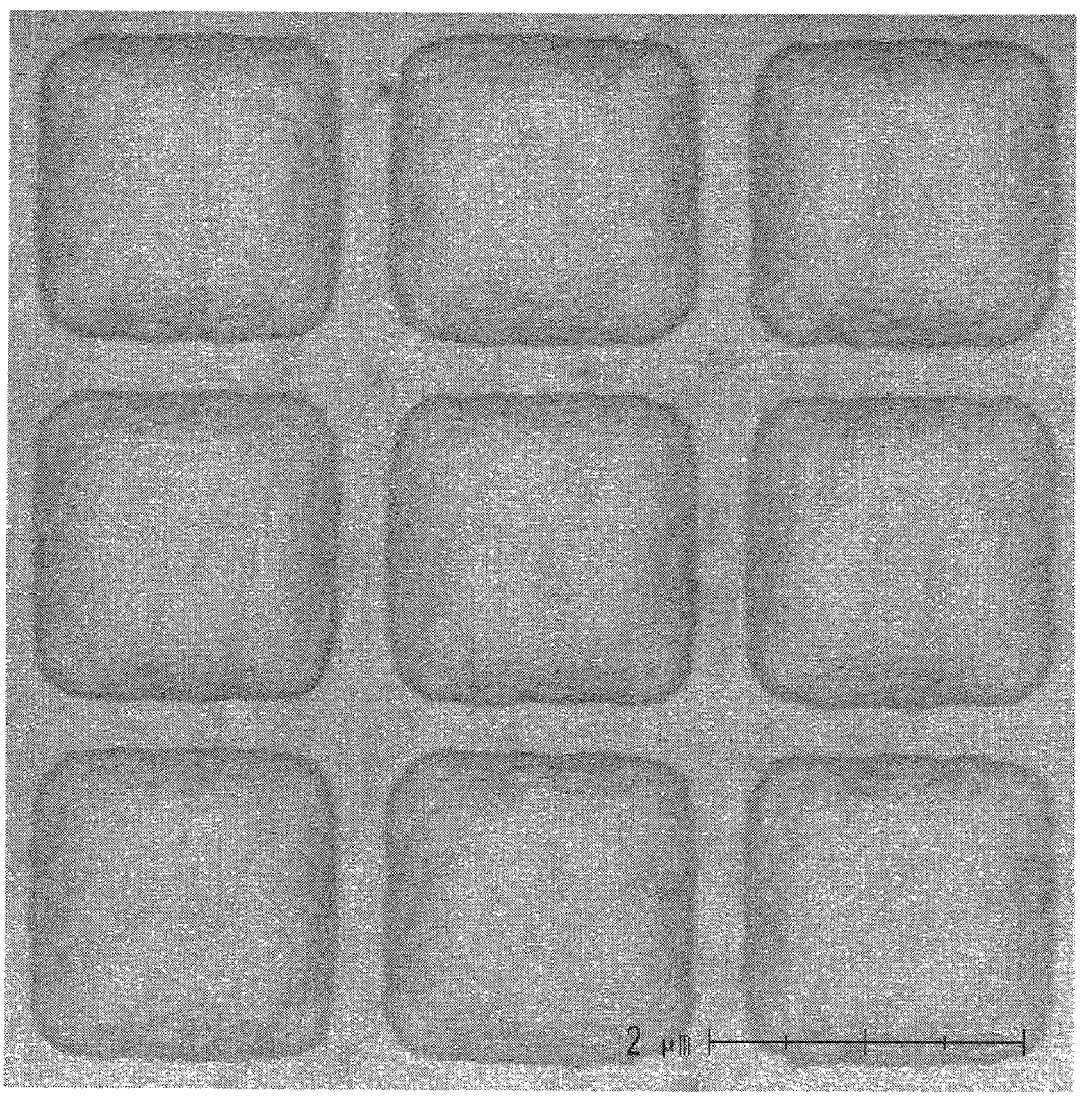
Figure 2C:
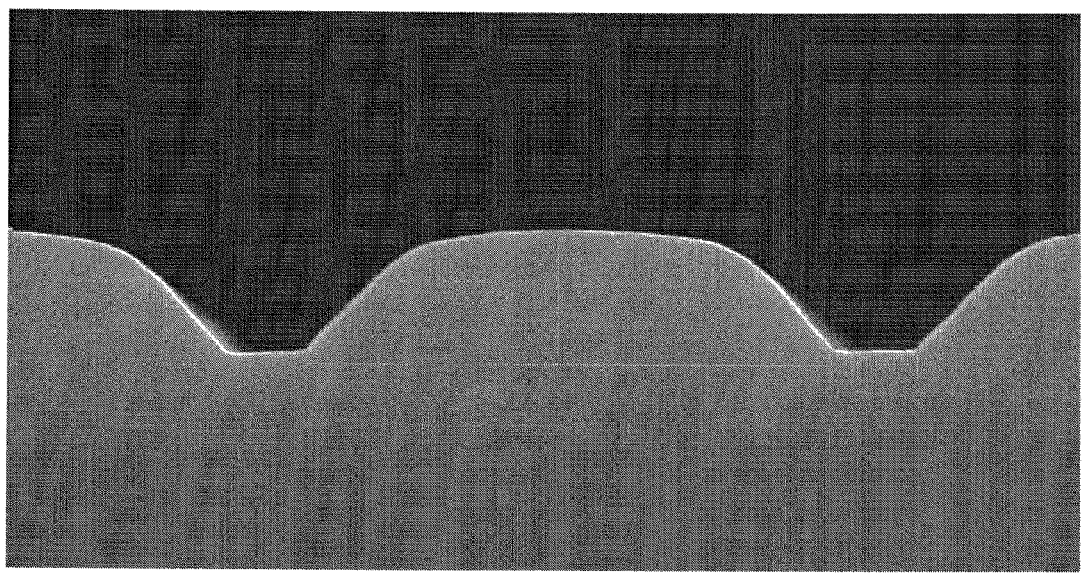

Example FIGS. 2A to FIG. 2C illustrate a seed layer generated after etching an LTO using a reflowed PR as a mask. As illustrated in example FIGS. 2A to FIG. 2C, a surface of the seed layer is rough and shows poor uniformity after the etching process. More significant roughness effects can be observed near edges of pixels and line edge roughness is also serious. One reason behind the problems disclosed above is presumed to be because PR used for etching has a small thickness.

Figure 3A:
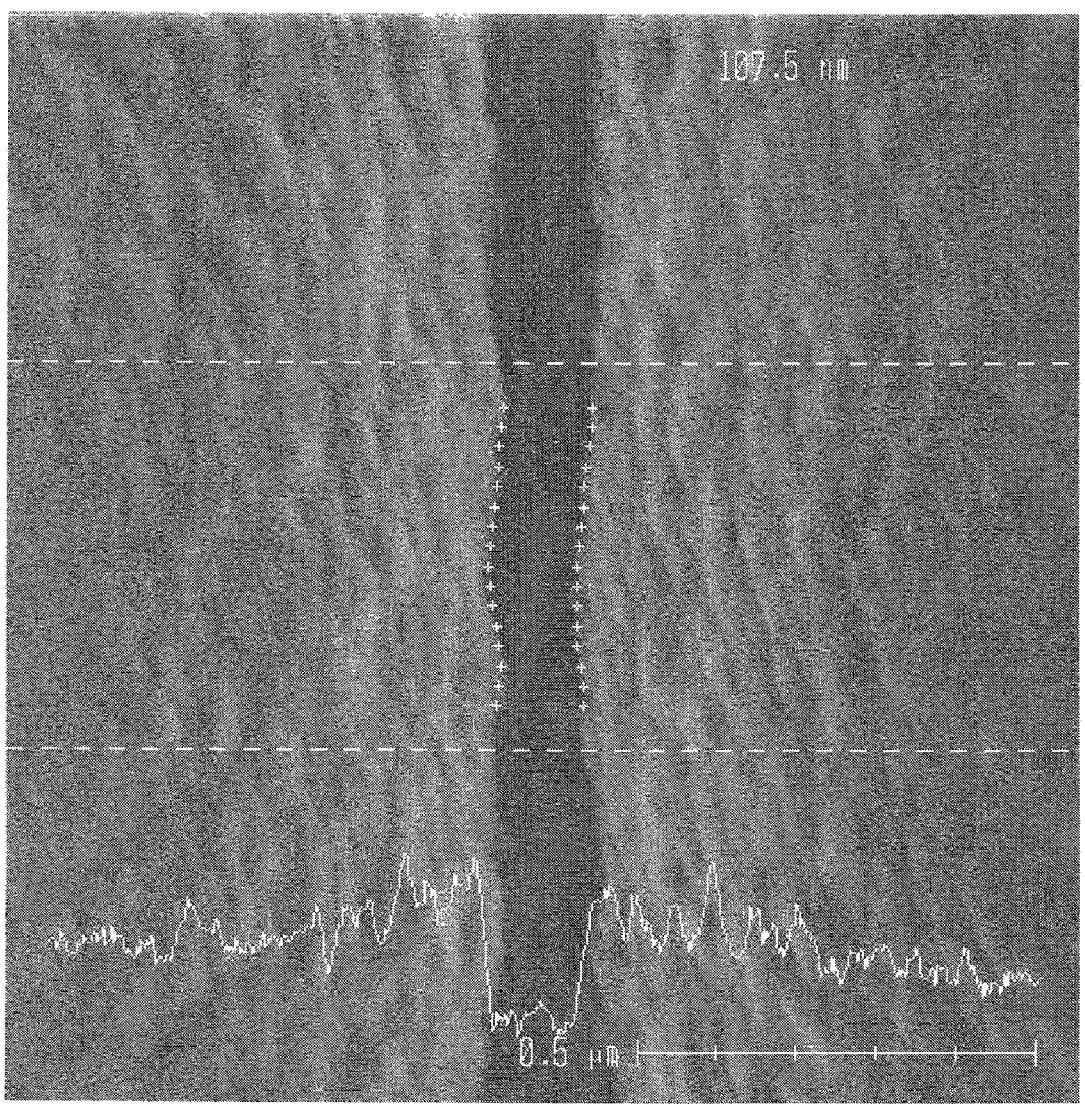
Figure 3B:
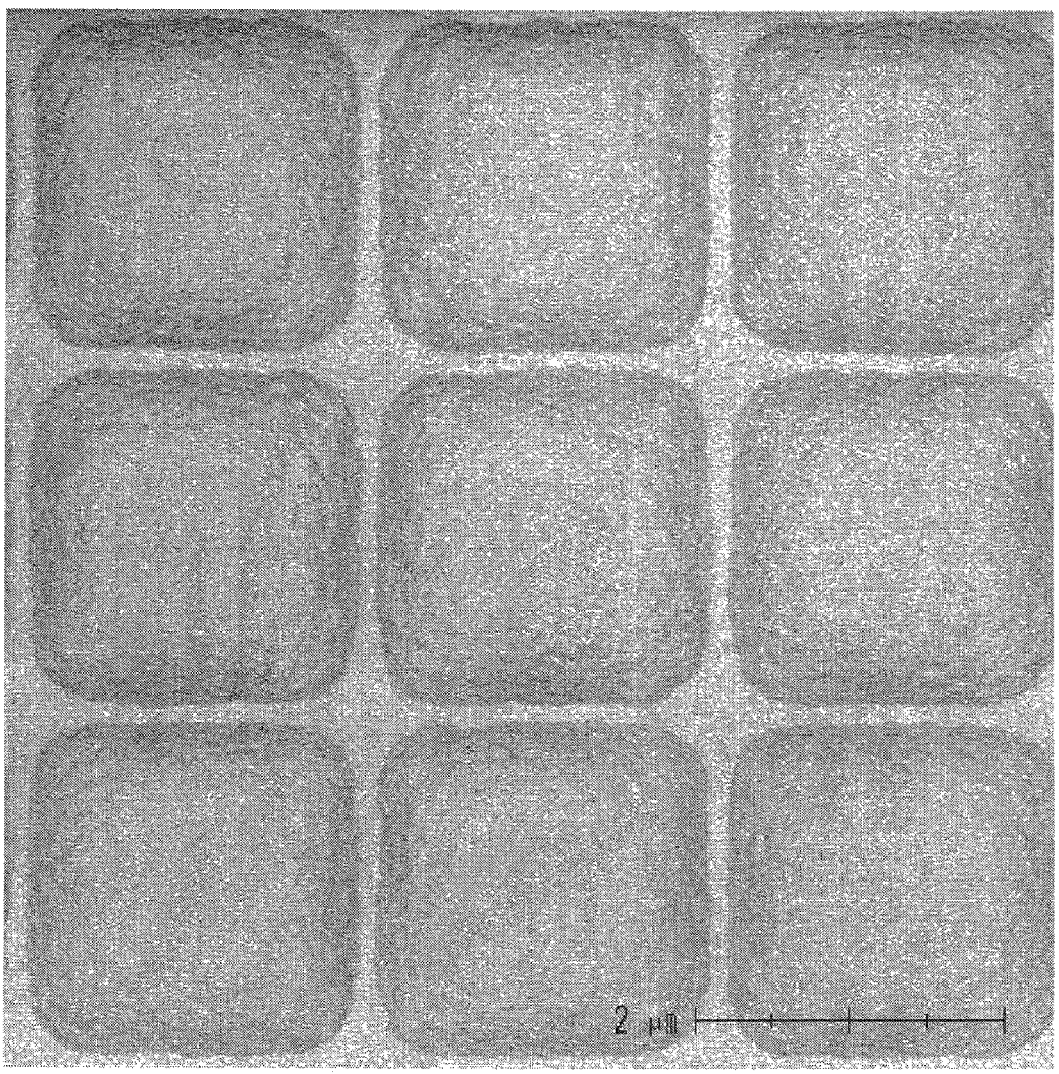
Figure 3C:
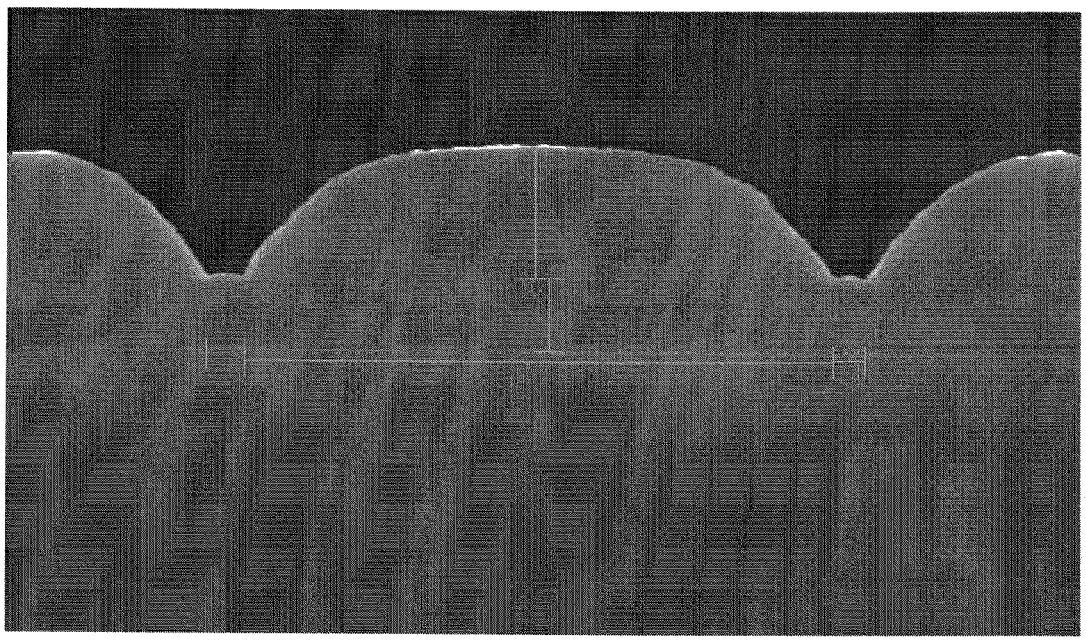

When depositing an LTO on and/or over a seed layer with high surface roughness (i.e., poor surface feature) as described above, an ML with poor surface roughness is formed as shown in example FIGS. 3A to FIG. 3C.

Accordingly, such processes for reflowing PR have disadvantages such as difficulty in statistical process control (SPC) and extreme roughness in edges patterned by a reflowed PR. Therefore, using the reflowed PR as a mask to etch an LTO still has a problem of poor edge profile. Such poor edge profile may induce a difference of characteristics between pixels in a microlens array, thereby causing a decrease in performance of a semiconductor device.

SUMMARY

Embodiments relate to a microlens (ML) with excellent surface features and a method for fabrication of the same.

Embodiments relate to a method for fabricating an ML with improved surface roughness which may include depositing an additional film on and/or over a seed layer of a wafer without any photoresist (PR) reflowing process.

Embodiments relate to a method for fabrication of an ML that can include at least one of the following steps: forming a seed layer pattern composed of silicon oxide on and/or over a wafer; and then rounding corner portions of the seed layer pattern by applying plasma; and then depositing an oxide film on and/or over the seed layer pattern.

Embodiments relate to a method that can include at least one of the following steps: forming a first oxide film on a wafer, and then forming a seed layer pattern by performing a first etching process on the first oxide film, and then performing a second etching process on the seed layer pattern to round the corner portions of the seed layer pattern, and then forming a second oxide film on the seed layer pattern.

The seed layer pattern may be formed by at least one of: depositing a seed layer on and/or over the wafer; and then forming a PR pattern for a lens on and/or over the seed layer; and then etching a portion of the seed layer using the PR pattern as a mask; and then removing PR residue after performing the etching step. The PR pattern may be formed with a thickness sufficient to allow the PR residue to have a thickness of not less than 1000 Å after the etching step. The etching step may be achieved by a polymer generation process so as to incline a lateral side of the pattern. Alternatively, a wet etching method using a PR pattern as a mask may be adopted for the etching step. The corner rounding step may include blanket (plasma) etching of the entire wafer to expose the corner of the seed layer pattern. Alternatively, the corner rounding step may include chemical downstream (plasma) etching of the entire wafer to expose the corner of the seed layer pattern.

Embodiments relate to an ML that can include at least one of the following: a wafer; a seed layer pattern formed on and/or over the wafer by corner rounding the seed layer; and a re-deposited oxide film formed on and/or over the seed layer pattern. The seed layer pattern is preferably corner-rounded by plasma etching the seed layer pattern in order to expose the corner of the seed layer pattern.

DRAWINGS

Example FIG. 1A illustrates the condition of a microlens before PR reflowing.

Example FIG. 1B illustrates the condition of a microlens after PR reflowing.

Example FIG. 1C illustrates a cross-sectional view of a wafer after PR reflowing.

Example FIG. 1D is a tilt image illustrating the condition of the wafer after PR reflowing.

Example FIGS. 2A to 2C illustrate a seed layer formed after etching an LTO with a reflowed PR as a mask.

Example FIGS. 3A to 3C illustrate a microlens with high surface roughness.

Example FIGS. 4A to 4E illustrate a microlens and a method for fabrication the same, in accordance with embodiments.

Figure 5A:
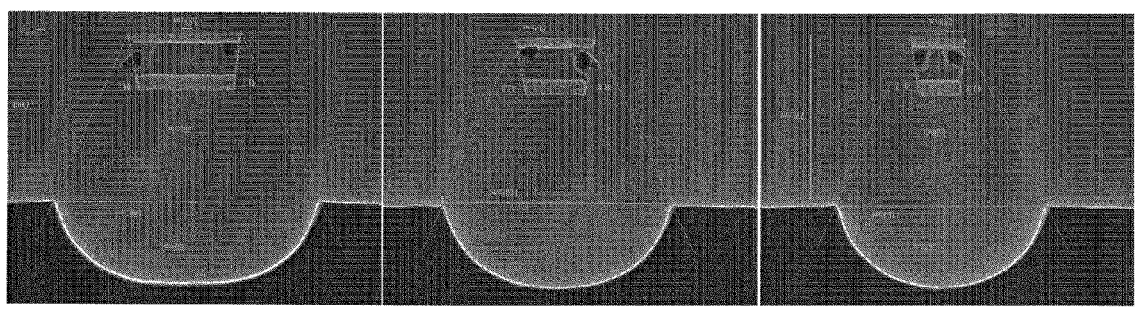
Figure 5B:
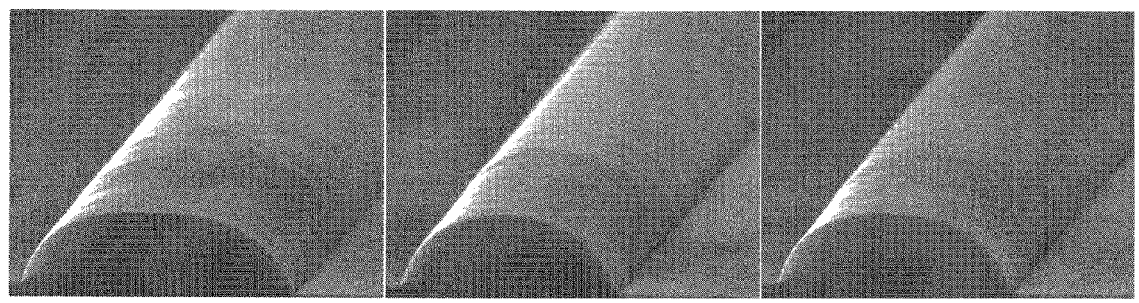

Example FIGS. 5A and 5B illustrate a shape of a microlens in accordance with embodiments.

Figure 6:
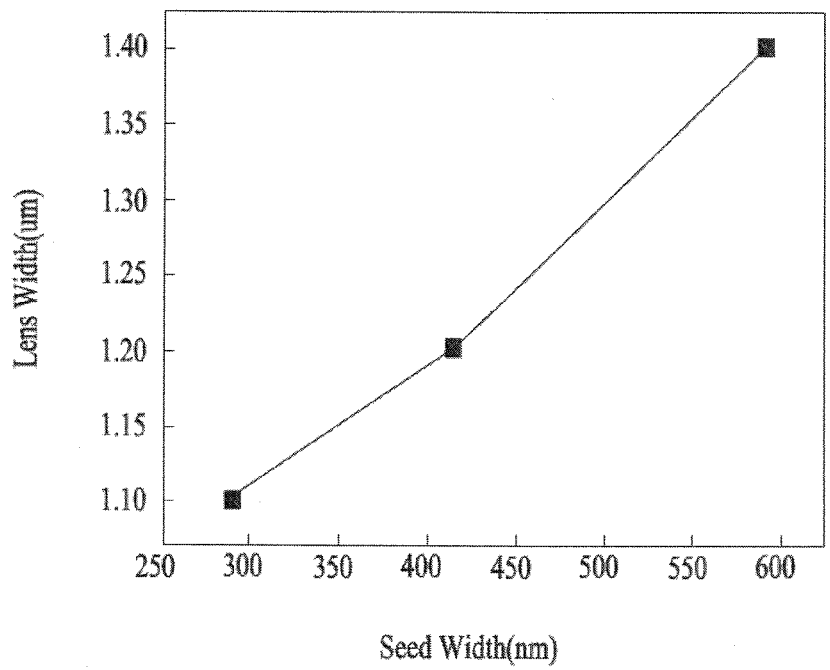

Example FIG. 6 is a graph illustrating variation in a width of a microlens with respect to a width of the seed layer, in accordance with embodiments.

Figure 7:
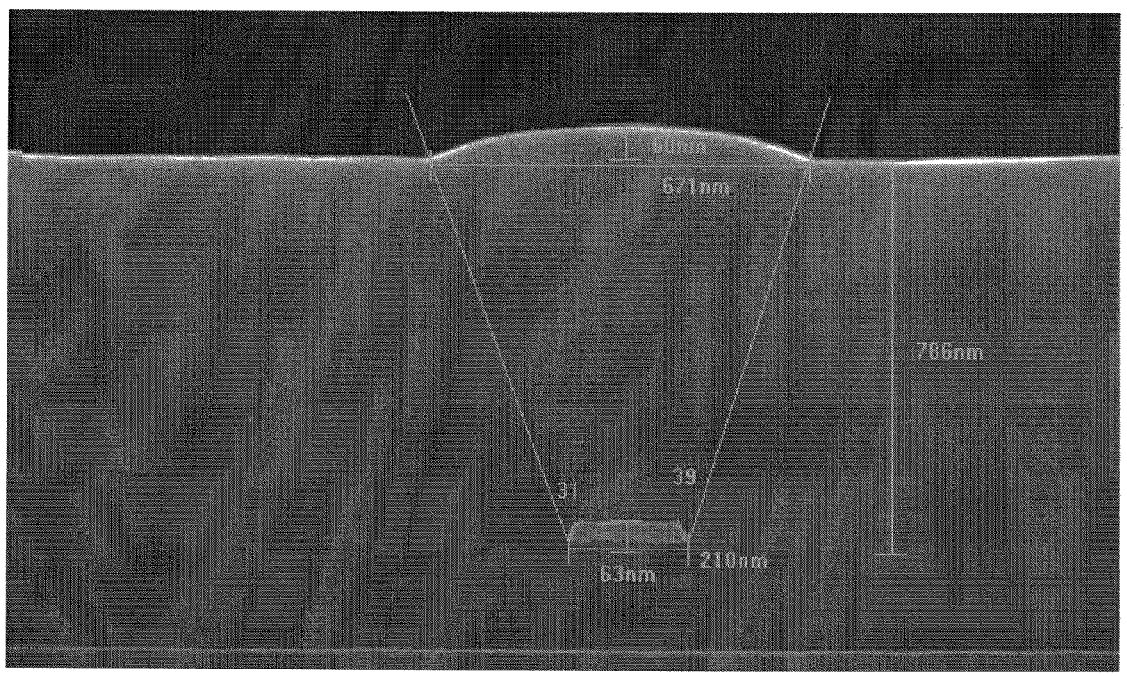

Example FIG. 7 illustrates a microlens formed when the seed layer has a reduced thickness, in accordance with embodiments.

Figure 8:
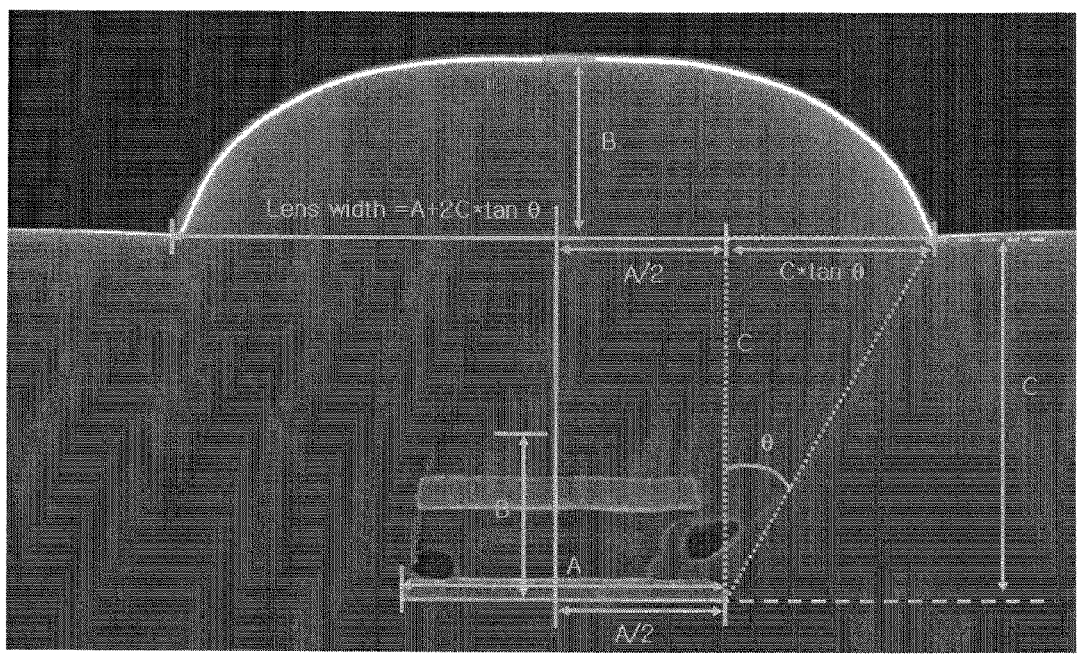

Example FIG. 8 illustrates a process for estimating an expected width of a microlens in relation to a width of the seed layer and a thickness of an additional film deposited on and/or over over the seed layer, in accordance with embodiments.

DESCRIPTION

Hereinafter, the preferred embodiments of the present invention will be described in more detail in view of technical constructions and functions of the present invention with reference to the accompanying drawings, which are proposed for illustrative purposes only and not intended to restrict the spirit and scope of the invention.

Figure 4A:
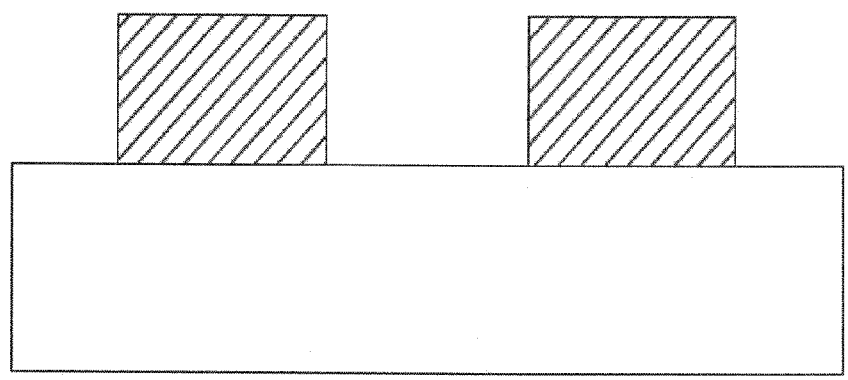
Figure 4B:
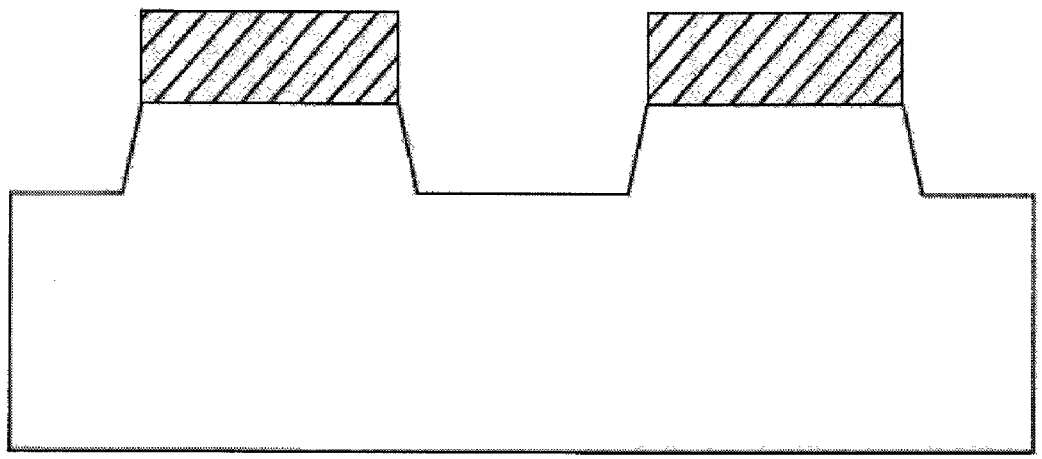
Figure 4C:
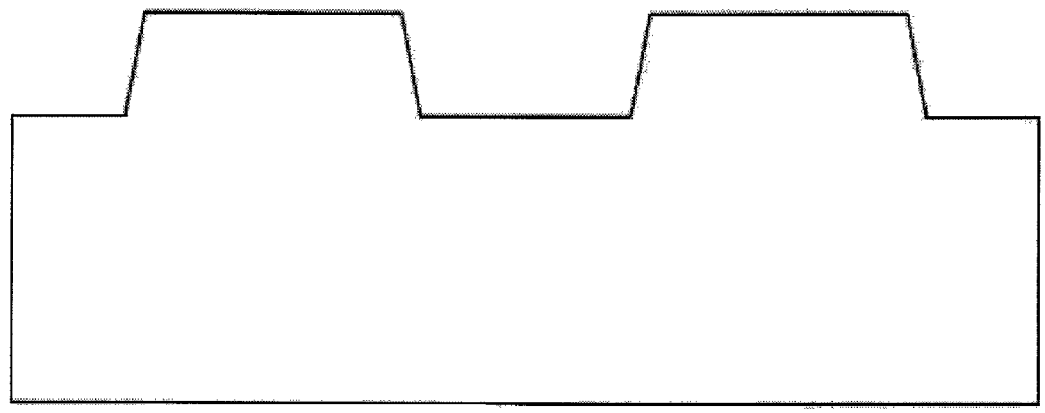
Figure 4D:
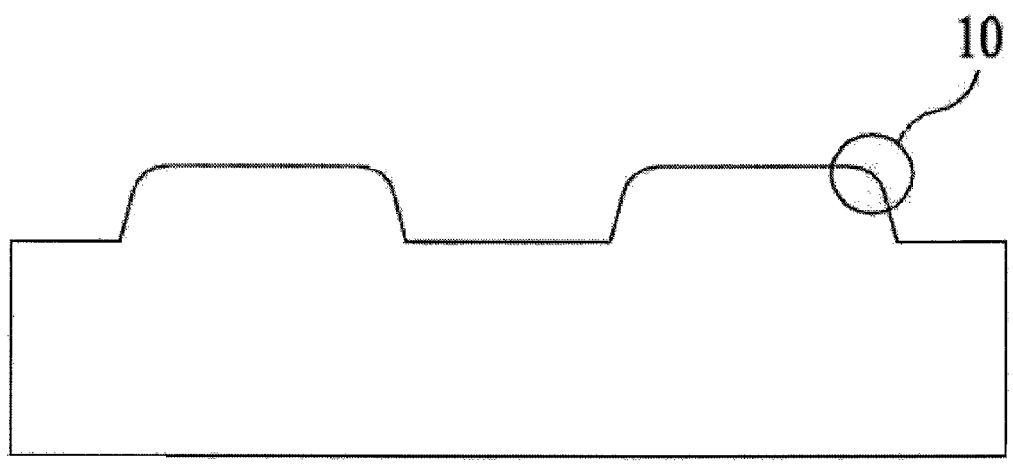
Figure 4E:
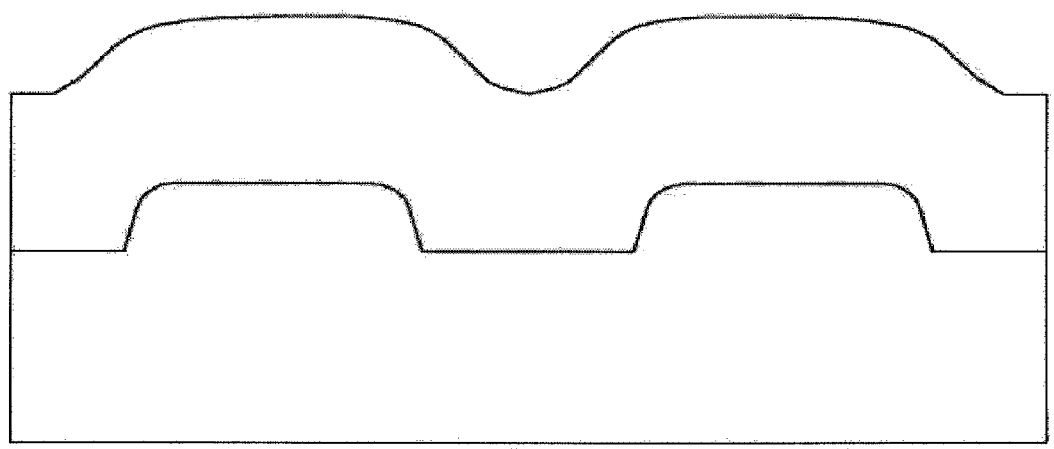

As illustrated in example FIG. 4E, microlens ML in accordance with embodiments may include a wafer, a seed layer pattern formed on and/or over the wafer by rounding corner 10 of the seed layer pattern 10, and then deposited an oxide film on and/or over the seed layer pattern. The seed layer pattern may be formed by forming a first oxide film on and/or over a wafer and then performing a first etching on the first oxide film to form the seed layer pattern. A second etching is then performed on seed layer pattern 10 through plasma exposure. The first etching is performed using a polymer generation process so as to incline a lateral side of the seed layer pattern. As an example of the first etching, it is preferable to use wet etching, although dry etching can be used as well. The second etching may be performed by blanket (plasma) etching to expose corner 10 of the seed layer pattern. Alternatively, chemical downstream (plasma) etching may also be adopted to expose the corner of the seed layer pattern.

Hereinafter, a procedure of fabricating an ML in accordance with embodiments will be described in more detail.

As illustrated in example FIGS. 4A to 4C, a PR pattern is applied to form a micro lens seed layer pattern on and/or over a wafer. In order to form the seed layer pattern, a seed layer is deposited on and/or over a wafer. Next, as illustrated in example FIG. 4A, a PR pattern is formed on and/or over the deposited seed layer. As illustrated in example FIG. 4B, the seed layer is partially and selectively etched using the PR pattern as a mask. In this case, the PR pattern has a thickness of not less than 1000 Å after the etching. Meaning, the PR pattern having a thickness of not less than 1000 Å remains on and/or over the seed layer pattern after the etching. Consequently, the PR pattern formed before the etching in accordance with embodiments has a predetermined thickness sufficient to allow PR residue after the etching to have a thickness of not less than 1000 Å. Additionally, the etching process using the PR pattern described above may include a polymer generation process so as to incline sidewalls of the seed layer pattern. For example, a wet etching or a dry etching that utilizes the polymer generation process may be performed.

As illustrated in example FIG. 4C, the seed layer pattern is completely formed by removing PR residue after the etching. As illustrated in example FIG. 4D, a corner rounding process of the seed layer pattern is performed. More particularly, the seed layer pattern is subjected to a corner rounding process using plasma throughout the entire wafer so as to obtain rounded corner portions of the seed layer pattern. The corner round process may include blanket (plasma) etching of the entire wafer and chemical downstream (plasma) etching of the entire to expose corner 10 of the seed layer pattern. More particularly, corner portions 10 of the seed layer pattern are exposed to plasma by the blanket etching or the chemical downstream etching, thus resulting in the rounded corner portions. As illustrated in example FIG. 4E, an additional oxide film is deposited on and/or over the corner rounded seed layer pattern to complete the fabrication of the ML as a final product.

Example FIGS. 5A and 5B illustrate a shape of the ML fabricated as illustrated in example FIGS. 4A to 4E, respectively. A control test was carried out for a seed layer made of an aluminum metal film instead of a silicon oxide film which was used as the seed layer in accordance with embodiments. Based on the test results, performance of the ML fabricated in accordance with embodiments was evaluated as follows. The seed layer composed of an aluminum metal film had a thickness of 360 nm. An oxide film 7750 nm in thickness was then formed on and/or over the seed layer, an additional oxide film to fabricate a micro lens.

Example FIG. 5A illustrates a variation in a width of the lens made of the oxide film with respect to different widths of the seed layer such as 290 nm, 410 nm and 591 nm, respectively, as well as profile variation of the lens. As illustrated in example FIG. 5A, the thickness of the lens made of the oxide film is substantially identical to that of the seed layer. In other words, the thickness of the ML can be regulated by adjusting the thickness of the seed layer so that the thickness of the ML can be more conveniently and effectively controlled.

As illustrated in example FIG. 5B, the geometric shape of the ML makes it evident that the ML in accordance with embodiments has enhanced surface roughness.

Example FIG. 6 is a graph illustrating variation in width of the ML with respect to a width of the seed layer in accordance with embodiments. The graph demonstrates that there is a linear relationship between variation in width of the ML and the width of the seed layer. Example FIG. 7 illustrates the ML formed when the seed layer made in accordance with embodiments has a small thickness. Example FIG. 8 illustrates a process for estimation of an expected width of the ML in relation to a width of the seed layer in accordance with embodiments and a thickness of an additional film deposited on and/or over the seed layer.

As illustrated in example FIG. 8, an expected width of the ML may be determined by the following Equation 1 in relation to a width of the seed layer in accordance with embodiments and a thickness of an additional film deposited on and/or over the seed layer:

$$ML\ \text{width(expected)} = A + 2C^* \tan \Theta \qquad \text{Equation 1}$$

wherein A is a floor width of the seed layer, C is a thickness of an additional film deposited on and/or the seed layer, and $\Theta$ is a conformal angle in an additional deposition process. For example, for PE-CVD, $\Theta$ may range from between 20° to 30° (20° $\leq \Theta \leq$ 30°).

As apparent from the above description, the method for fabrication of an ML in accordance with embodiments uses a corner rounding process of a seed layer pattern. Therefore, after re-deposition of an additional oxide film on and/or over the seed layer pattern, the fabricated ML exhibits improved surface roughness at the interface, i.e., edges between the seed layer and the deposited oxide film. Consequently, the ML has a fine surface formed using the deposited oxide film. Moreover, LTOs may be used to prepare the seed layer and the deposited oxide film in accordance with embodiments.

In accordance with embodiments, a lens with improved surface roughness can be successfully embodied even when an additional film is deposited on and/or over a seed layer without PR reflowing for a corner rounding process of the seed layer. Of course, the method in accordance with embodiments that does not require a PR reflowing process can easily perform SPC. The corner rounding of the seed layer using plasma in accordance with embodiments leads to a great improvement in roughness at the interface between the seed layer on the under layer and the additional oxide film deposited on and/or over the seed layer as well as surface roughness in edge regions between pixels. In addition, a difference of CDs between MLs (i.e., pixels) is noticeably enhanced thereby improving performance of an image sensor.

Furthermore, the overall width and thickness of the ML can be easily controlled by adjusting a thickness of the additional oxide film deposited on and/or over the seed layer relative to a thickness and a width of the seed layer on the under layer. This feature is advantageous to regulate a focal length of the ML. In brief, the shape of the ML may be simply controlled along a size of the seed layer. Finally, the ML in accordance with embodiments is readily applicable to leading edge technologies that require a small pitch and a small thickness of the ML.

In accordance with embodiments, prevention of exposure of a seed layer during etching may be accomplished by effectively increasing a thickness of PR which is used to form a seed layer pattern on and/or an underlying layer. As a result, the seed layer is protected owing to the increased thickness of PR and is essentially unaffected by etching, thus maintaining a certain surface roughness during deposition.

Embodiments can reduce surface roughness by rounding corner portions of the seed layer formed on the underlying layer through plasma exposure prior to a further deposition of additional film on and/or over the top surface of the seed layer pattern. This means that the lens has improved surface quality by compensating for the seed layer.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method comprising:
   forming a seed layer pattern on a wafer; and then
   rounding the corner portions of the seed layer pattern by applying plasma; and then
   depositing an oxide film on the seed layer pattern.

2. The method of claim 1, wherein forming the seed layer pattern comprises:
   forming a seed layer on the wafer; and then
   forming a photoresist pattern on the seed layer; and then
   etching a portion of the seed layer using the photoresist pattern as a mask; and then
   removing photoresist residue from the seed layer after performing the etching.

3. The method of claim 2, wherein the photoresist pattern formed is formed with a thickness that permits the photoresist residue to have a thickness of not less than 1000 Å after performing the etching.

4. The method of claim 2, wherein the etching is performed by a polymer generation process so as to incline the sidewalls of the seed layer pattern.

5. The method of claim 2, wherein the etching is performed by a wet etching process using the photoresist pattern as a mask.

6. The method of claim 1, wherein rounding the corner portions is performed using plasma blanket etching.

7. The method of claim 1, wherein rounding the corners is performed using plasma chemical downstream etching.

8. The method of claim 1, wherein the seed layer comprises an oxide material.

9. The method of claim 8, wherein said oxide material comprises silicon oxide.

10. A method for fabrication of a microlens comprising:
    forming a first oxide film on a wafer; and then
    forming a seed layer pattern by performing a first etching process on the first oxide film; and then
    performing a second etching process on the seed layer pattern to round the corner portions of the seed layer pattern; and then
    forming a second oxide film on the seed layer pattern.

11. The method of claim 10, wherein the second etching process comprises a plasma etching process.

12. The method of claim 11, wherein the plasma etching process comprises at least one of blanket etching and chemical downstream etching.

13. The method of claim 10, wherein the first oxide film and the second oxide film are composed of the same material.

14. The method of claim 10, wherein the first oxide film and the second oxide film comprise a low temperature oxide.

15. The method of claim 10, wherein the first etching comprises inclining the sidewalls of the seed layer pattern.

16. The method of claim 10, wherein the first etching comprises a wet etching process.

* * * * *